Figures 1, 2:
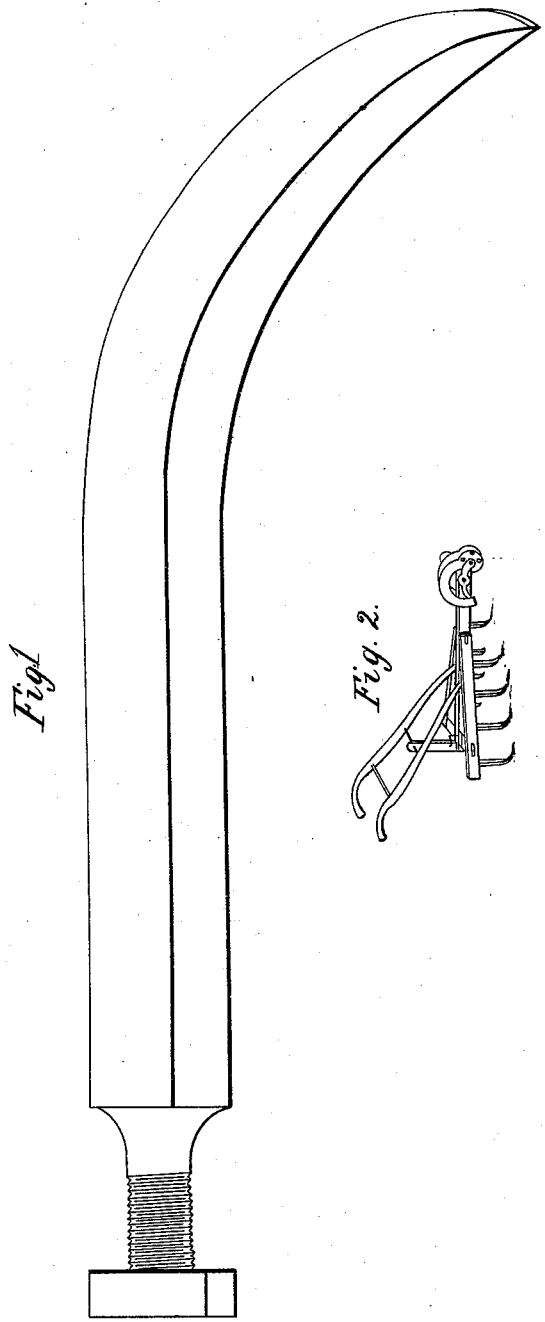

H. F. French.
Cultivator Teeth.
Nº 93,695.   Patented Aug. 17, 1869.

Witnesses,
Frank G. Parker
Jno. L. _____

Inventor,
Henry F. French

United States Patent Office.

HENRY F. FRENCH, OF BOSTON, MASSACHUSETTS.

IMPROVEMENT IN TEETH FOR CULTIVATORS.

Specification forming part of Letters Patent No. 93,695, dated August 17, 1869.

*To all whom it may concern:*

Be it known that I, HENRY F. FRENCH, of Boston, in the county of Suffolk and Commonwealth of Massachusetts, have invented a new and useful Improvement on Teeth for Cultivators; and I do hereby declare that the following is a full, clear, and exact description of the construction and operation of the same, reference being had to the annexed drawings, making a part of this specification, in which—

Figure 1 is a full-size side view. Fig. 2 is a view of the teeth in place.

The teeth are of steel or other metal that will wear smooth, about one inch square, with a corner on the forward or inner curve, about ten inches in length, below the frame in which they are set, and pointed, as shown. They are to be set in an ordinary adjustable horse-cultivator, about seven or nine making a set, and secured in place by screws and nuts, or otherwise.

In the culture of roots just above the ground—such as turnips, mangolds, and carrots—or of tender plants newly set—as strawberries, asparagus, and tobacco—the teeth of all our cultivators have been so wide as to throw a small furrow and cover the plants, or prevent running near them. Ordinary harrow-teeth obviate this objection to some extent; but they work only on the surface, and tend to harden the soil, and are easily knocked sidewise by a sod or stone upon the rows. Even the reversible teeth of plowshare form designed to throw the earth from the rows are so large and clumsy that they, in fact, throw the earth both ways, as much as the ordinary cultivator-tooth of two and a half or three inches breadth. Again, we have no light-horse implement that runs deep enough and light enough to draw out twitch-grass, sorrel, and other noxious roots. Ordinary cultivators cannot run deep enough, and, if they could, would be too heavy of draft, and they at once clog with earth and cannot be kept clear. This form of tooth is such that it enters the ground as deep as the wheel allows, is obtuse enough not to cut through the roots, yet is so narrow as to be of easy draft, and brings all roots to the surface. The small size of the teeth prevents the machine from clogging with earth, and their pointed shape makes them easy to clean by simply jumping the cultivator without stopping the horse. Most cultivators have three or five teeth, and when they strike a stone or sod are knocked sidewise and endanger the plants. The number of these small teeth and the deep hold they have on the soil make the machine run very steadily, and make it easy to hold, and the small size of the teeth make the machine light to handle. The shape of the teeth is such as to make them easy to form out of ordinary square bars, and therefore cheap, and to keep them sharp by ordinary wear. The curve of the tooth is not unlike that of an English scarifier; but that is a ponderous implement to be worked by four or more horses in clearing ground preparatory to the crop.

My inability to find in the market or in the Patent Office reports any implement combining the qualities named led to the invention of this. The concurrent opinions of the best market-gardeners in the neighborhood, that it supplies a want long existing, assures me of its value, and my desire to render it generally useful induces me to apply for this patent. I would cheerfully dedicate it to the public were I not satisfied that it will be better introduced by limiting the sale to some manufacturer of known standing, who will insure the public a well-made article.

What I claim as my invention, and desire to secure by Letters Patent, is—

The cultivator-tooth formed from a square bar, and pointed, and curved at the point diagonally, as shown and described.

HENRY F. FRENCH.

Witnesses:
 JAS. S. CONANT,
 FRANK G. PARKER.